(12) United States Patent
Uemura

(10) Patent No.: US 6,348,891 B1
(45) Date of Patent: Feb. 19, 2002

(54) FAR FIELD MONITOR APPARATUS

(75) Inventor: Toshimi Uemura, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/630,275

(22) Filed: Aug. 1, 2000

(30) Foreign Application Priority Data

Aug. 2, 1999 (JP) ............................................. 11-219030

(51) Int. Cl.⁷ ............................... G01S 1/16; G01S 1/18
(52) U.S. Cl. ......................... 342/413; 342/410; 342/411
(58) Field of Search ................................ 342/407, 410, 342/411, 412, 413

(56) References Cited

U.S. PATENT DOCUMENTS 5,323,165 A * 6/1994 Greving et al. ............. 342/410
5,475,393 A * 12/1995 Heinzerling ................ 342/410

\* cited by examiner

Primary Examiner—Theodore M. Blum
(74) Attorney, Agent, or Firm—Ostrolenk, Faber, Gerb & Soffen, LLP

(57) ABSTRACT

In a far field monitor apparatus, each of first and second ILS localizers includes a receiving antenna, a plurality of couplers, a combiner, a receiver, and a first detector. The receiving antenna is formed from a plurality of antenna elements symmetrically arranged in a direction perpendicular to the longitudinal direction of a runway. The receiving antennas of the first and second ILS localizers oppose each other. The couplers are arranged in units of antenna elements to pick up some of signals obtained by the antenna elements in a predetermined amplitude and phase. The combiner combines output signals from the couplers. The receiver receives a combined signal output from the combiner. The first detector detects, on the basis of a receiving signal output from the receiver, a predetermined monitor parameter representing the radiation state of a radio wave radiated from the opposing-side ILS localizer.

23 Claims, 9 Drawing Sheets

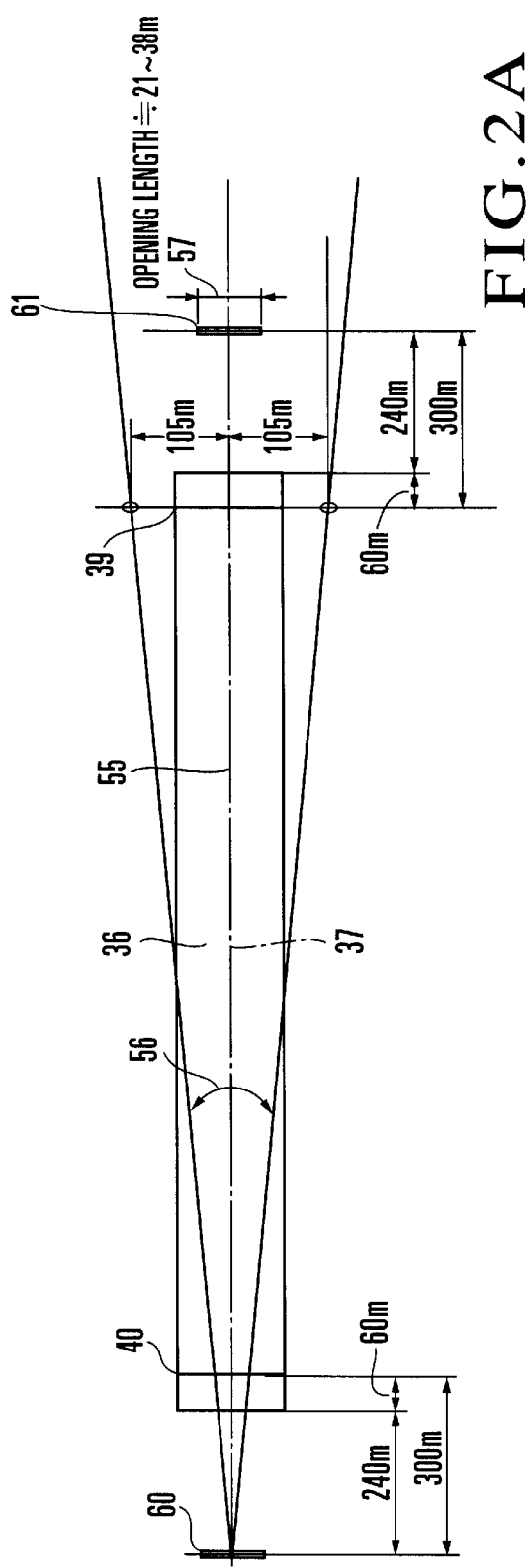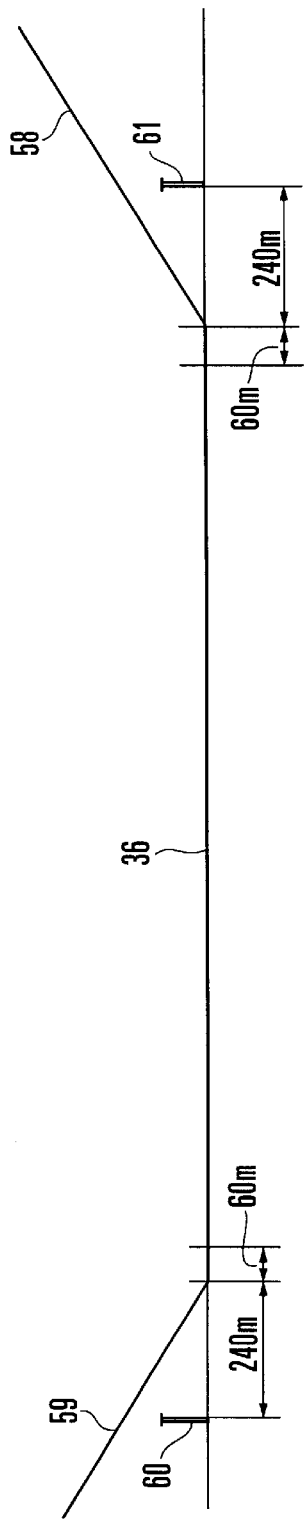

FAR FIELD MONITOR APPARATUS

BACKGROUND OF THE INVENTION

The present invention relates to a far field monitor apparatus and, more particularly, to double-side ILS (Instrument Landing System) approach far field monitor apparatus using the integral monitor circuit of an opposing-side ILS.

Generally, an airport where aircraft departs/arrives uses an ILS which helps aircraft to land using radio waves. As one of apparatuses constructing the ILS, a localizer for guiding to a landing aircraft a horizontal shift from the runway center is installed.

The localizer radiates, from the front side of a landing aircraft, carrier and sideband patterns having components modulated by 90 Hz and 150Hz and different directivities. The aircraft receives the radio waves from the localizer and derives parameters including the DDM (Difference of Depth of Modulation) between the two radio waves, thereby detecting the horizontal shift from the runway center. Hence, it must be monitored at a predetermined accuracy whether the radio waves are radiated from the localizer.

Conventionally, a far field monitor apparatus has been proposed as an apparatus for monitoring radio waves radiated from a localizer and, more particularly, an apparatus for monitoring a radiation characteristic in the far field of a localizer. FIG. 8 shows a conventional far field monitor apparatus.

Referring to FIG. 8, a far field monitor antenna 100 comprises three receiving antennas 101a to 101c and receives radio waves radiated from a localizer. Receiving signals from the receiving antennas 101a to 101c are combined by a combiner 102, divided into three signals by a divider 103, and output to ILS receivers 104a to 104c.

The ILS receivers detect monitor signals from the receiving signals and output the monitor signals to detectors 105a to 105c each incorporating a timer circuit. When the monitor signal level exceeds a predetermined value, and its duration exceeds a predetermined value, the detectors 105a to 105c output alarm signals to a majority determination circuit 106. The majority determination circuit 106 determines the majority of received alarm signals and outputs a control signal 107 for transferring or shutting down the transmitter.

The operation of the conventional far field monitor apparatus will be described next.

The receiving antennas 101a to 101c are directivity antennas represented by log-periodic antennas and sequentially installed on an extended runway center line 108 at an interval of 30 m. ILS localizer signals received by the receiving antennas 101a to 101c are vector-combined by the combiner 102, divided into three signals by the divider 103, and supplied to the ILS receivers 104a to 104c, i.e., onboard receivers, respectively.

The ILS receivers 104a to 104c detect DDMs and flag currents (FLAGs) from the receiving signals and output them to the detectors 105a to 105c, respectively. When the values of DDMs or FLAGs as monitor signals exceed a predetermined value, the internal timer circuits of the detectors 105a to 105c start measuring duration.

If the duration exceeds a predetermined time within the range of 30 to 240 sec, the detectors 105a to 105c determine "alarm" and output alarm signals to the majority determination circuit 106. The actual duration is determined depending on the operation situation of each airport. When it is determined using a predetermined alarm determination scheme, e.g., ⅔ majority determination scheme that two or more detectors have output the alarm signals for one monitor item, the majority determination circuit 106 outputs the control signal 107 for transferring or shutting down the transmitter.

FIGS. 9A and 9B show an installation example of the conventional far field monitor apparatus.

To monitor, equivalently as in the far field, the radiation characteristic of an array antenna having a plurality of antenna elements and an aperture 57 as large as 21 to 38 m, the monitoring must be done at a position separated by about 1,060 m that is calculated by $$r \geq 2 \times (AP)2/\mu$$

where r is the minimum distance (m), AP is the aperture (=38 m), and λ is the wavelength (m) (=300/110 (MHz)=2.727 (m)).

Normally, the far field monitor antenna 100 is installed at one of a rear position 109 of the middle marker on the extended runway center line 108, an intermediate position 110 between the middle marker and the inner marker, and an intermediate position 111 between the inner marker and the opposing-side localizer. The antenna height is set within a range not exceeding a 2% approach surface 58 defined as an obstacle clearance such that an outlook over an operation-side ILS localizer 60 can be ensured.

Reference numeral 36 denotes a runway; 37, a runway center line; 39, a threshold; 40, a stop end; 55, a localizer course; 56, a course width; 60, an operation-side ILS localizer; 61, an opposing-side localizer; 62, an inner marker; and 63, a middle marker.

However, such a conventional far field monitor apparatus suffers the following problems.

As the first problem, the indicator of the far field monitor is unstable. This is because the far field monitor is arranged on the localizer course and therefore readily affected by secondary reflected waves from approaching or departing aircraft or aircraft moving on the runway.

As the second problem, an error in DDM as one of monitor signals is not always detected. This is because two or three antennas are installed along the flight course, and receiving signals are averaged in practice, although a number of antennas are preferably used to monitor the average course in the far field. For this reason, when the direct waves and reflected waves are combined in opposite phases, or the direct waves are shielded by an obstacle, the apparent DDM is determined to fall within the predetermined value range, and no error is detected, although the receiving signals are at noise level.

As the third problem, to reliably receive and monitor weak radio waves at a far position close to the ground surface, the receiving antenna becomes high to increase the risk for aircraft. The reason is as follows. When the antenna is installed near, e.g., the middle marker, the distance to the receiving point is as long as about 5 km. For this reason, the receiving field strength decreases due to the influence of a decrease in angle of incidence due to the curvature of earth, i.e., an increase in vertical plane pattern loss. Hence, to ensure the visibility over the transmission point and ensure the receiving field strength, the height of receiving antenna must be increased within the range not exceeding the approach surface.

As the fourth problem, the apparatus has a large scale, and the installation cost is high. To install the far field monitor apparatus including three receiving antennas at an interval of 30 m at the rear position of the middle marker, the intermediate position between the middle marker and the inner marker, or the intermediate position between the middle marker and the inner marker, a wide area must be ensured, and large-scale construction is required.

SUMMARY OF THE INVENTION

It is an object of the present invention to provide a stable far field monitor apparatus free from detection error even when it is affected by secondary reflected waves from aircraft and the like.

It is another object of the present invention to provide an inexpensive and simple far field monitor apparatus having a small height.

In order to achieve the above objects, according to the present invention, there is provided a far field monitor apparatus having first and second ILS (Instrument Landing System) localizers opposing via a runway in a longitudinal direction, each of the first and second ILS localizers comprising receiving antenna means formed from a plurality of antenna elements symmetrically arranged in a direction perpendicular to the longitudinal direction of the runway, the receiving antenna means of the first and second ILS localizers opposing each other, a plurality of coupling means, arranged in units of antenna elements, for picking up some of signals obtained by the antenna elements in a predetermined amplitude and phase, combine means for combining output signals from the coupling means, receiving means for receiving a combined signal output from the combine means, and first detection means for detecting, on the basis of a receiving signal output from the receiving means, a predetermined monitor parameter representing a radiation state of a radio wave radiated from the opposing-side ILS localizer.

BRIEF DESCRIPTION OF THE DRAWINGS

FIGS. 2A and 2B are plan and side views, respectively, showing the detailed arrangement of the far field monitor apparatus shown in FIG. 1;

DESCRIPTION OF THE PREFERRED EMBODIMENT

The present invention will be described below in detail with reference to the accompanying drawings.

Figure 1:
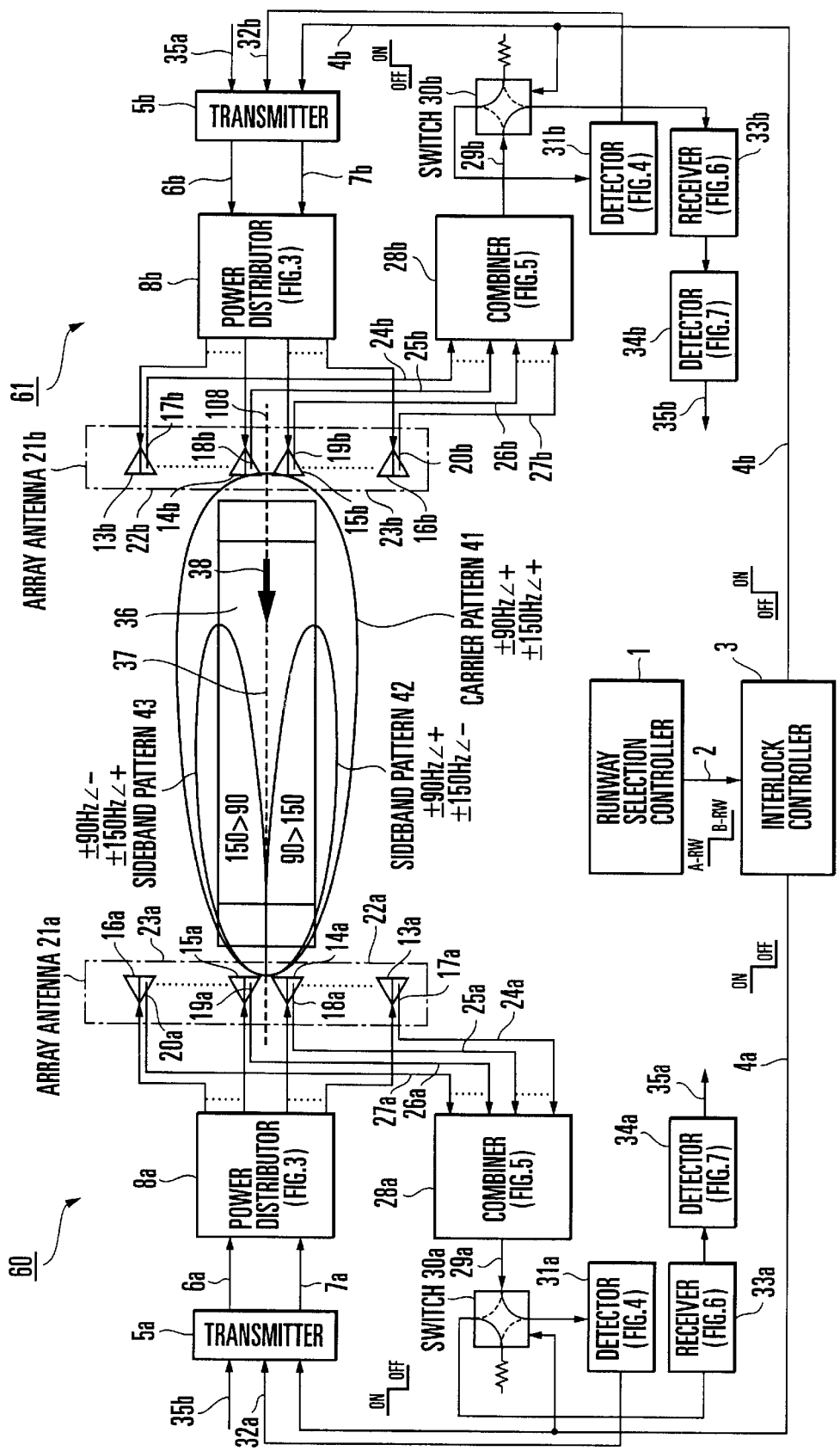
FIG. 1 is a block diagram of a far field monitor apparatus according to an embodiment of the present invention.

FIG. 1 shows a far field monitor apparatus according to an embodiment of the present invention. In the far field monitor apparatus of this embodiment, as shown in FIGS. 2A and 2B, an operation-side ILS localizer 60 and opposing-side ILS localizer 61 oppose each other via a runway 36 in the longitudinal direction. The monitor operation is performed using course detection by the integral monitor circuit of the opposing-side ILS localizer 61. In the runway 36, a direction parallel to the takeoff/landing direction of aircraft will be called as a runway longitudinal direction, and a runway center line 37 means a center line extending parallel to the runway longitudinal direction, for the descriptive convenience.

Referring to FIG. 1, the opposing-side ILS localizer 61 comprises an array antenna 21b symmetrically arranged in a direction perpendicular to an extended runway center line 108 as an extended line of the runway center line 37, couplers 17b to 20b for picking up some of signals received by the array antenna 21b in a predetermined amplitude and phase, a combiner 28b for combining the outputs from the couplers 17b to 20b in phase, a receiver 33b for receiving a combined signal 29b from the combiner 28b through a switch 30b, and a detector 34b for detecting, on the basis of the receiving output from the receiver 33b, a predetermined monitor parameter representing the radiation state of a radio wave radiated from the operation-side ILS localizer 60.

When a radio wave is radiated from the opposing-side ILS localizer 61, the switch 30b inserted between the combiner 28b and the receiver 33b selectively outputs the combined signal from the combiner 28b to an integral monitor detector 31b of the opposing-side ILS localizer 61. When a radio wave is radiated from the operation-side ILS localizer 60, the combined signal from the combiner 28b is selectively output to the receiver 33b.

A plurality of antenna elements 13b to 16b of the array antenna 21b are symmetrically arranged in a direction perpendicular to the extended runway center line 108 at predetermined positions so as to oppose an array antenna 21a of the operation-side ILS localizer 60 via the runway 36 in the runway longitudinal direction.

Some of signals received by the antenna elements 13b to 16b are induced in the pickup elements 17b to 20b incorporated in the antenna elements 13b to 16b, respectively, in a predetermined amplitude and phase and combined by course detection by the combiner 28b, so the combined signal 29b is output. The combined signal 29b is selectively output to the receiver 33b and detector 34b through the switch 30b.

On the other hand, in the operation-side ILS localizer 60, the array antenna 21a is symmetrically arranged in a direction perpendicular to the extended runway center line 108 at a predetermined position on the extended runway center line 108. Some of signals radiated from a plurality of antenna elements 13a to 16a of the array antenna 21a are induced in pickup elements 17a to 20a incorporated in the antenna elements 13a to 16a, respectively, in a predetermined amplitude and phase and combined by course detection by a combiner 28a, so a combined signal 29a is output. The combined signal 29a is selectively output to a detector 31a through a switch 30a.

An interlock controller 3 receives a runway selection signal 2 from a runway selection controller 1 and outputs an interlock signal negation signal 4b to a transmitter 5b and switch 30b of the opposing-side ILS localizer 61. The interlock controller also outputs an interlock control signal 4a to a transmitter 5a and switch 30a of the operation-side ILS localizer 60. When the runway selection signal 2 from the runway selection controller 1 is inverted, the opposite- and operation-side localizers replace with each other and perform reverse operations.

The operation of the far field monitor apparatus having the above arrangement will be described next.

Normally, an approach direction 38 to the runway 36 is decided by a controller who totally determines meteorological conditions including the direction of wind. When the runway selection signal 2 is supplied from the runway selection controller 1 to the interlock controller 3 on the basis of this decision, the interlock control signal 4a and interlock control signal negation signal 4b are output.

When the operation-side ILS localizer 60 will operate, the interlock control signal 4a controls the transmitter 5a of the operation-side ILS localizer 60 to the ON state (operative state) and also controls the switch 30a to output the combined signal 29a from the combiner 28a to the detector 31a. On the other hand, the interlock control signal negation signal 4b controls the transmitter 5b of the opposing-side ILS localizer 61 to the OFF state (inoperative state) and also controls the switch 30b to output the combined signal 29b from the combiner 28b to the receiver 33b and detector 34b.

Upon receiving the interlock control signal 4a from the interlock controller 3, the transmitter 5a generates a carrier signal 6a and sideband signal 7a and outputs them to a power divider 8a. The carrier signal 6a is obtained by amplitude-modulating (modulation depth: about 20%) a carrier wave signal by a 90-Hz component and 150-Hz component in phase. The sideband signal 7a is obtained by balanced-modulating one sideband component (90 Hz or 150 Hz) such that it has a phase opposite to that in the carrier signal.

Figure 3:
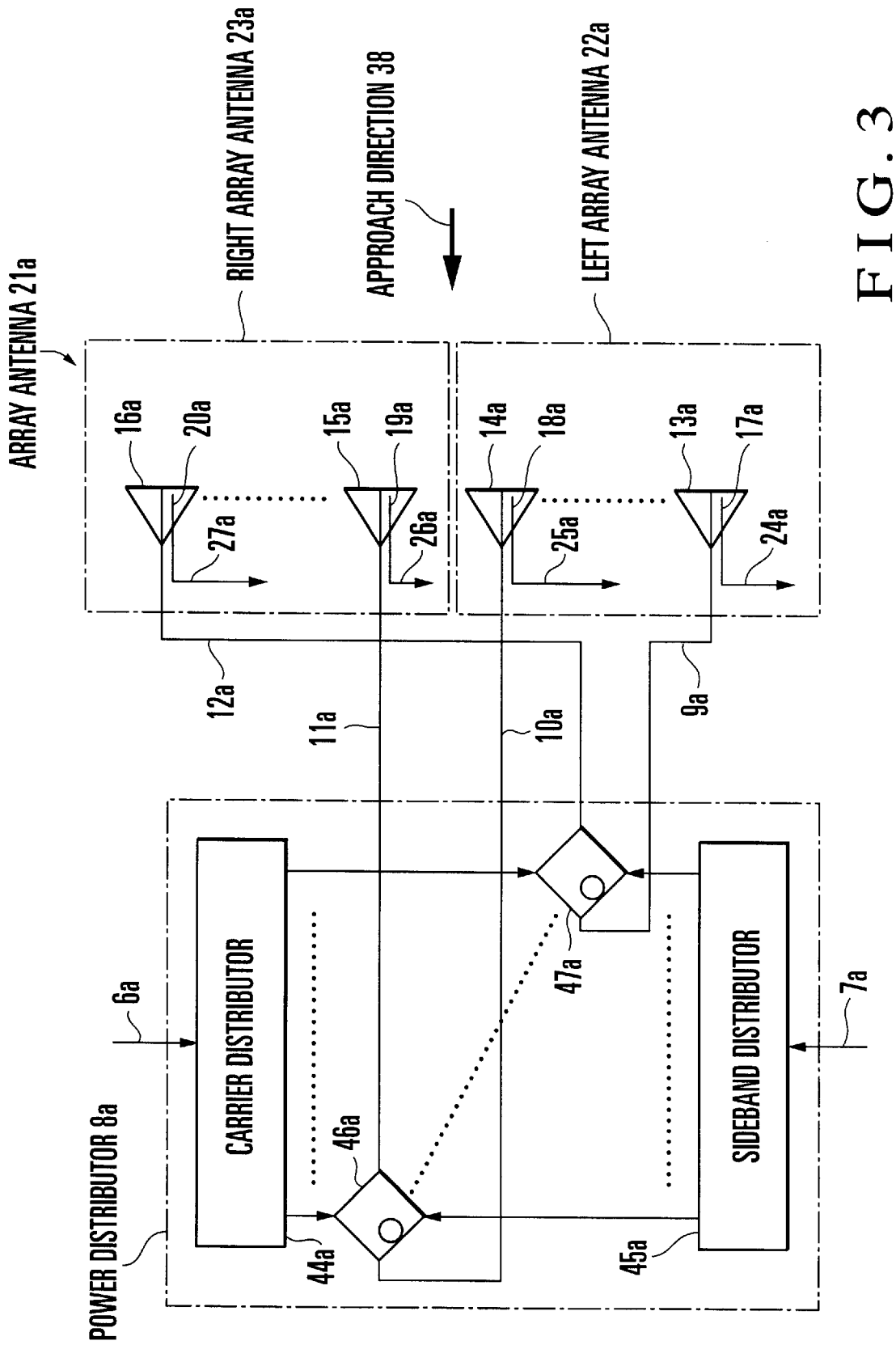
FIG. 3 is a block diagram showing the detailed arrangement of a power divider and array antenna shown in FIG. 1.

FIG. 3 shows the power divider 8a and array antenna 21a. A power divider 8b and array antenna 21b have the same arrangements as in FIG. 3.

Referring to FIG. 3, the carrier signal 6a input to the power divider 8a is divided into components in number equal to ½ the number of antenna elements by a carrier divider 44a on the basis of a desired current ratio and also divided into two in-phase components by dividers/combiners 46a and 47a.

Carrier sideband combined signals 9a to 12a output from the dividers/combiners 46a and 47a are supplied in predetermined combinations to the plurality of antenna elements 13a and 14a of a left array antenna 22a when viewed from aircraft and the plurality of antenna elements 15a and 16a of a right array antenna 23a. As a result, a carrier pattern 41 having in-phase components on the left and right sides of the runway center line 37 is formed.

Similarly, the sideband signal 7a is divided into components in number equal to ½ the number of antenna elements by a sideband divider 45a on the basis of a desired current ratio and also divided into two components in opposite phases by the dividers/combiners 46a and 47a.

The signals are supplied to the plurality of antenna elements 13a and 14a of the left array antenna 22a when viewed from aircraft and the plurality of antenna elements 15a and 16a of the right array antenna 23a. As a result, a sideband pattern 42 and sideband pattern 43 having components in opposite phases on the left and right sides of the runway center line 37 are formed, as shown in FIG. 1.

As shown in FIG. 3, the plurality of antenna elements 13a to 16a formed from log-periodic antennas incorporate the pickup elements 17a to 20a for picking up certain components of the radiated signals at a coupling factor of 15 dB and relative phase of 0°, respectively. Pickup signals 24a to 27a from the pickup elements 17a to 20a are supplied for course detection by the combiner 28a.

In course detection by the combiner 28a, pickup signals adjacent to each other are sequentially vector-combined in phase by tournament, thereby obtaining the RF combined signal 29a. Such a monitor scheme is called an integral monitor scheme. The RF combined signal 29a is output to the detector 31a through the switch 30a.

Figure 4:
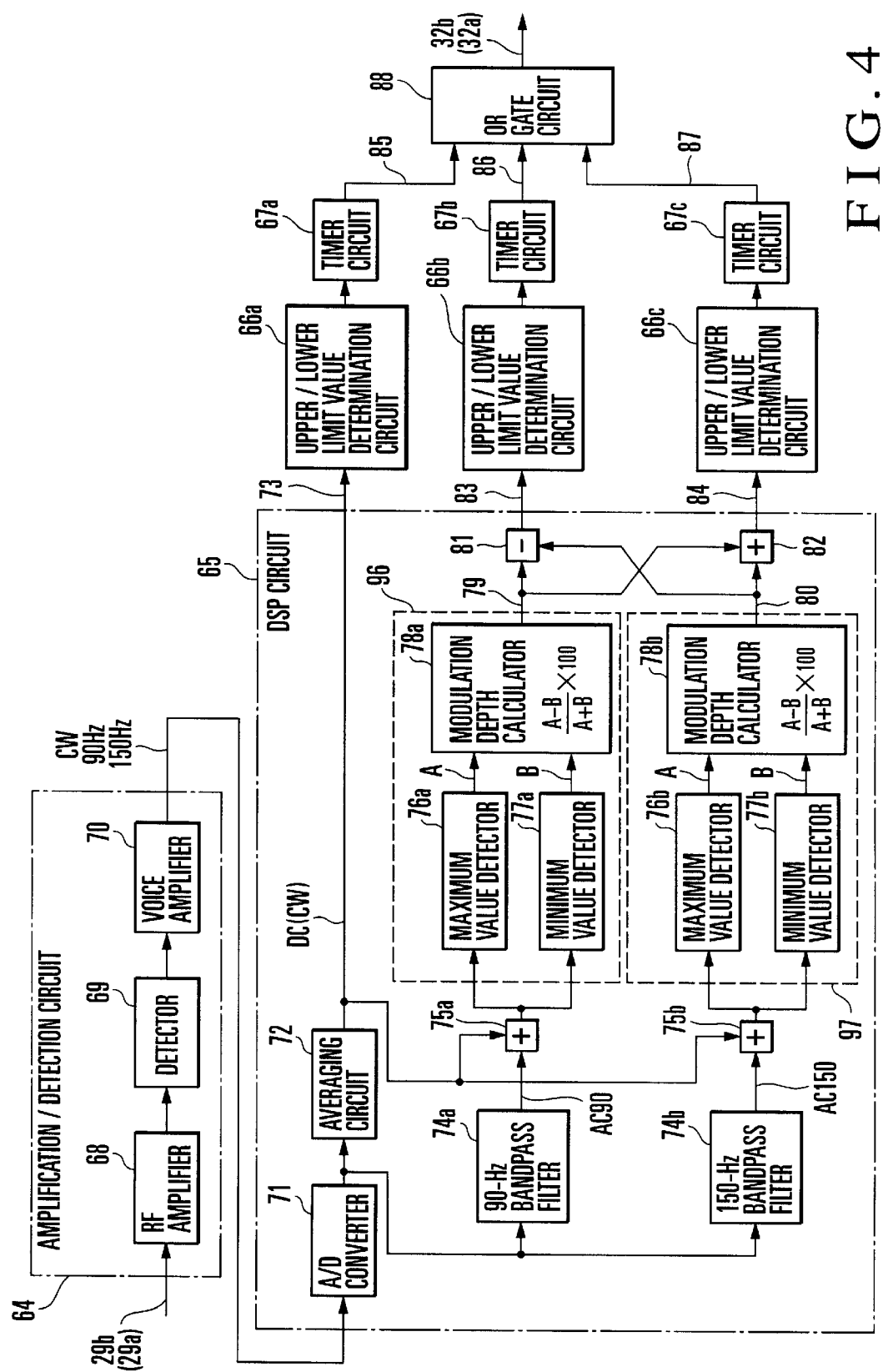
FIG. 4 is a detailed block diagram of an integral monitor detector shown in FIG. 1.

FIG. 4 shows the integral monitor detector 31a. The integral monitor detector 31b has the same arrangement as that of the detector 31a.

As shown in FIG. 4, the detector 31a comprises an amplification/detection circuit 64 for receiving the combined signal 29a and outputting an analog voice signal, a DSP (Digital Signal Processing) circuit 65 formed from a microprocessor for receiving the analog voice signal from the amplification/detection circuit 64 and outputting an RF signal 73, DDM signal 83, and SDM signal 84, upper/lower limit value determination circuits 66a to 66c for receiving the output signals 73, 83, and 84 from the DSP circuit 65, timer circuits 67a to 67c for receiving the output signals from the upper/lower limit value determination circuits 66a to 66c, respectively, and an OR gate circuit 88 for receiving the output signals from the timer circuits 67a to 67c.

The amplification/detection circuit 64 comprises an RF amplifier 68 for receiving the combined signal 29a or 29b, a detector 69 for receiving the output signal from the RF amplifier 68, and a voice amplifier 70 for receiving the output signal from the detector 69 and outputting a voice signal.

The DSP circuit 65 comprises an A/D converter 71 for receiving the voice signal, an averaging circuit 72 for receiving the output signal from the A/D converter 71, a 90-Hz bandpass filter 74a and 150-Hz bandpass filter 74b, an adder 75a for adding the outputs from the 90-Hz bandpass filter 74a and averaging circuit 72, an adder 75b for adding the outputs from the 150-Hz bandpass filter 74b and averaging circuit 72, a maximum value detector 76a and minimum value detector 77a which receive the output from the adder 75a, a maximum value detector 76b and minimum value detector 77b which receive the output from the adder 75b, a modulation depth calculator 78a for receiving the outputs from the maximum value detector 76a and minimum value detector 77a, a modulation depth calculator 78b for receiving the outputs from the maximum value detector 76b and minimum value detector 77b, a subtractor 81 for subtracting the outputs from the modulation depth calculators 78a and 78b, and an adder 82 for adding the outputs from the modulation depth calculators 78a and 78b.

The RF combined signal 29a or 29b is amplified by the RF amplifier 68 to a level necessary for linear by the detector 69 and detected by the detector 69. The output from the detector 69 is video-amplified to an input level necessary for the A/D converter 71 and adjusted in its offset zero level by the voice amplifier 70. An analog voice signal obtained by AM-modulating (modulation depth: 20%) the carrier wave (CW) by 90- and 150-Hz modulation waves is output from the voice amplifier 70 to the DSP circuit 65.

The voice signal input to the DSP circuit 65 is converted into a digital signal by the A/D converter 71 and input to the averaging circuit 72, 90-Hz bandpass filter 74a, and 150-Hz bandpass filter 74b. The averaging circuit 72 averages the input signal and detects the RF level 73 and a DC (CW) component necessary for modulation depth calculation later. In averaging processing, the input signal is accumulated and added a predetermined number (n: positive integer) of times and divided by the predetermined number (n), so the noise component is reduced to $1/\sqrt{n}$ in terms of S/N ratio. The above-described predetermined number of times is set on the basis of the apparatus installation environment (noise environment) or response required for the processing operation of the apparatus.

The 90-Hz bandpass filter 74a and 150-Hz bandpass filter 74b are formed from digital filters and extract an 90-Hz AC component and 150-Hz AC component from the output from the AID converter 71, respectively.

The DC (CW) component output from the averaging circuit 72 and the 90-Hz AC component output from the 90-Hz bandpass filter 74a are added by the adder 75a to generate a 90-Hz AM-demodulated wave.

The maximum value detector 76a detects the peak value (A) of the envelope of the 90-Hz AM-demodulated wave while the minimum value detector 77a detects its minimum value (B). The modulation depth calculator 78a calculates a 90-Hz modulation depth 79 from (A−B)/(A+B)×100 (%).

In a similar way, the DC (CW) component output from the averaging circuit 72 and the 150-Hz AC component output from the 150-Hz bandpass filter 74b are added by the adder 75b to generate a 150-Hz AM-demodulated wave. The maximum value detector 76b detects the peak value (A) of the envelope of the 150-Hz AM-demodulated wave while the minimum value detector 77b detects its minimum value (B). The modulation depth calculator 78b calculates a 150-Hz modulation depth 80 from (A−B)/(A+B)×100 (%).

The 90-Hz modulation depth 79 and 150-Hz modulation depth 80 are subtracted by the subtractor 81 to generate the DDM signal 83. The 90-Hz modulation depth 79 and 150-Hz modulation depth 80 are also added by the adder 82 to generate the SDM (Sum of Depth of Modulation) signal 84. The averaging circuit 72 outputs the DC (CW) component as the RF level 73.

The maximum value detector 76a, minimum value detector 77a, and modulation depth calculator 78a construct a first modulation depth calculation section 96. The maximum value detector 76b, minimum value detector 77b, and modulation depth calculator 78b construct a second modulation depth calculation section 97.

As another arrangement of the first modulation depth calculation section 96, the maximum amplitude value of the 90-Hz AC component from the 90-Hz bandpass filter 74a may be detected with reference to the RF level representing the DC component, and the 90-Hz modulation depth 79 may be calculated from maximum amplitude value/RF level×100 (%) on the basis of the obtained maximum amplitude value and RF level. With this arrangement, the above-described influence of noise in the minimum value detectors 77a and 77b can be avoided.

In a similar manner, as another arrangement of the second modulation depth calculation section 97, the maximum amplitude value of the 150-Hz AC component from the 150-Hz bandpass filter 74b may be detected with reference to the RF level representing the DC component, and the 150-Hz modulation depth 80 may be calculated from maximum amplitude value/RF level×100 (%) on the basis of the obtained maximum amplitude value and RF level.

Alternatively, the modulation depth may be calculated using the average value of maximum amplitude values detected from the 90-Hz AC component or 150-Hz AC component a plurality of number of times. With this arrangement, the influence of noise can be suppressed, and a stable maximum amplitude value and the 90- and 150-Hz modulation depths can be obtained.

Thus, the DSP circuit 65 outputs the DDM signal 83, SDM signal 84, and RF level 73 from the voice output obtained by the amplification/detection circuit 64. Of the outputs from the DSP circuit 65, the DDM signal 83 is input to the upper/lower limit value determination circuit 66b, the SDM signal 84 is input to the upper/lower limit value determination circuit 66c, and the RF level 73 is input to the upper/lower limit value determination circuit 66a.

The upper/lower limit value determination circuits 66a to 66c always compare the values of the monitor parameters (RF, DDM, and SDM) with upper and lower allowable values (predetermined values) and output alarm signals when the values exceed the predetermined values. The timer circuits 67a to 67c measure the alarm duration for the monitor parameters: RF, DDM, and SDM on the-basis of the alarm signals from the upper/lower limit value determination circuits 66a to 66c, respectively.

When the alarm duration exceeds a predetermined time set within the range of 30 to 240 sec, the timer circuits 67a to 67c output an RF alarm signal 85, DDM alarm signal 86, and SDM alarm signal 87 to the OR gate circuit 88, respectively. When even one of the alarm signals is input, the OR gate circuit 88 outputs a control signal 32a or 32b for transferring or shutting down the transmitter 5a.

As shown in FIG. 1, when carrier signals in phase are radiated from the left array antenna 22a and right array antenna 23a, the carrier pattern 41 that is maximized on the runway center line 37 is formed by spatial combine. When sideband signals in opposite phases are radiated from the left array antenna 22a and right array antenna 23a, the sideband patterns 42 and 43 that become null on the runway center line 37 are formed by spatial combine.

As shown in FIG. 2, the aperture 57 of the opposing-side ILS localizer 61 is, e.g., 21 m when the number of antenna elements is 14, or about 38 m when the number of antenna elements is 24. On the other hand, the course width 56 is adjusted by flight check to be ±105 m (±350 ft) with respect to the runway center line 37 on the threshold 39. The ratio of the aperture 57 to the course width 56 is ±10.5 m/±105 m=10% when the number of antenna elements is 14, or ±19 m/±105 m=18% when the number of antenna elements is 24: the ratio is sufficiently small with respect to the course width that allows precision approach.

Hence, the plurality of antenna elements constructing the receiving antenna of the far field monitor apparatus of the present invention (i.e., the antenna elements of the ILS localizer opposing the operating ILS localizer), and in this case, the antenna elements 13b to 16b can be regarded to be almost located on the extended runway center line 108, i.e., the localizer course 55.

Figure 5:
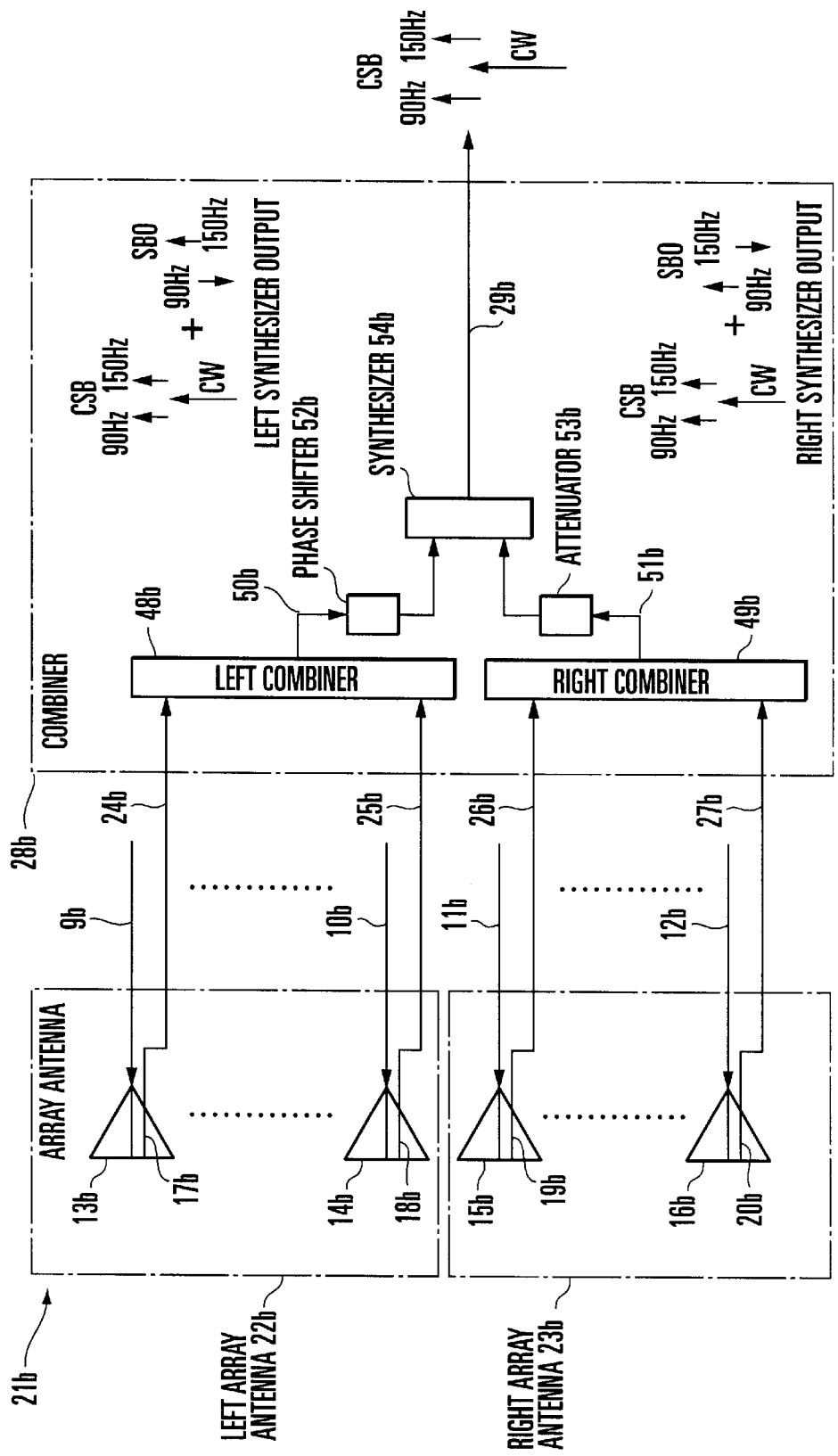
FIG. 5 is a detailed block diagram of the array antenna and combiner shown in FIG. 1.

FIG. 5 shows the array antenna 21b and combiner 28a. The array antenna 21a and combiner 28b have the same arrangements as those shown in FIG. 5.

As shown in FIG. 5, receiving signals received by the plurality of antenna elements 13b and 14b of a left array antenna 22b are induced in the pickup elements 17b and 18b in a desired amplitude and phase and supplied to a left combiner 48b of the combiner 28b. The left combiner 48b vector-combines adjacent signals of a plurality of pickup signals 24b and 25b and further vector-combines the combined signals by tournament, thereby obtaining a left combined output 50b.

On the other hand, receiving signals received by the plurality of antenna elements 15b and 16b of a right array antenna 23b are induced in the pickup elements 19b and 20b in a desired amplitude and phase and supplied to a right combiner 49b of the combiner 28b. The right combiner 49b vector-combines adjacent signals of a plurality of pickup signals 26b and 27b and further vector-combines the combined signals by tournament, thereby obtaining a right combined output 51b.

The left combined output 50b is supplied to a combiner 54b through a phase shifter 52b, and the right combined output 51b is supplied to the combiner 54b through an attenuator 53b. The phase shifter 52b finely adjusts and equalizes the average phases of the left and right combined outputs. The attenuator 53b finely adjusts and equalizes the average amplitudes of the left and right combined outputs. The combiner 54b combines the output from the phase shifter 52b and the output from the attenuator 53b and extracts the combined signal 29b containing only the carrier component by canceling the sideband components of the left combined output 50b and right combined output 51b. In the combined signal 29b, the difference in modulation depth between 90 Hz and 150 Hz is 0 DDM, the sum of depth of modulation is 0.4 SDM, and RF=CW.

The combined signal 29b equivalent to the receiving signals from the plurality of antenna elements 13b to 16b is output from the switch 30b to the detector 34b through the receiver 33b.

Figure 6:
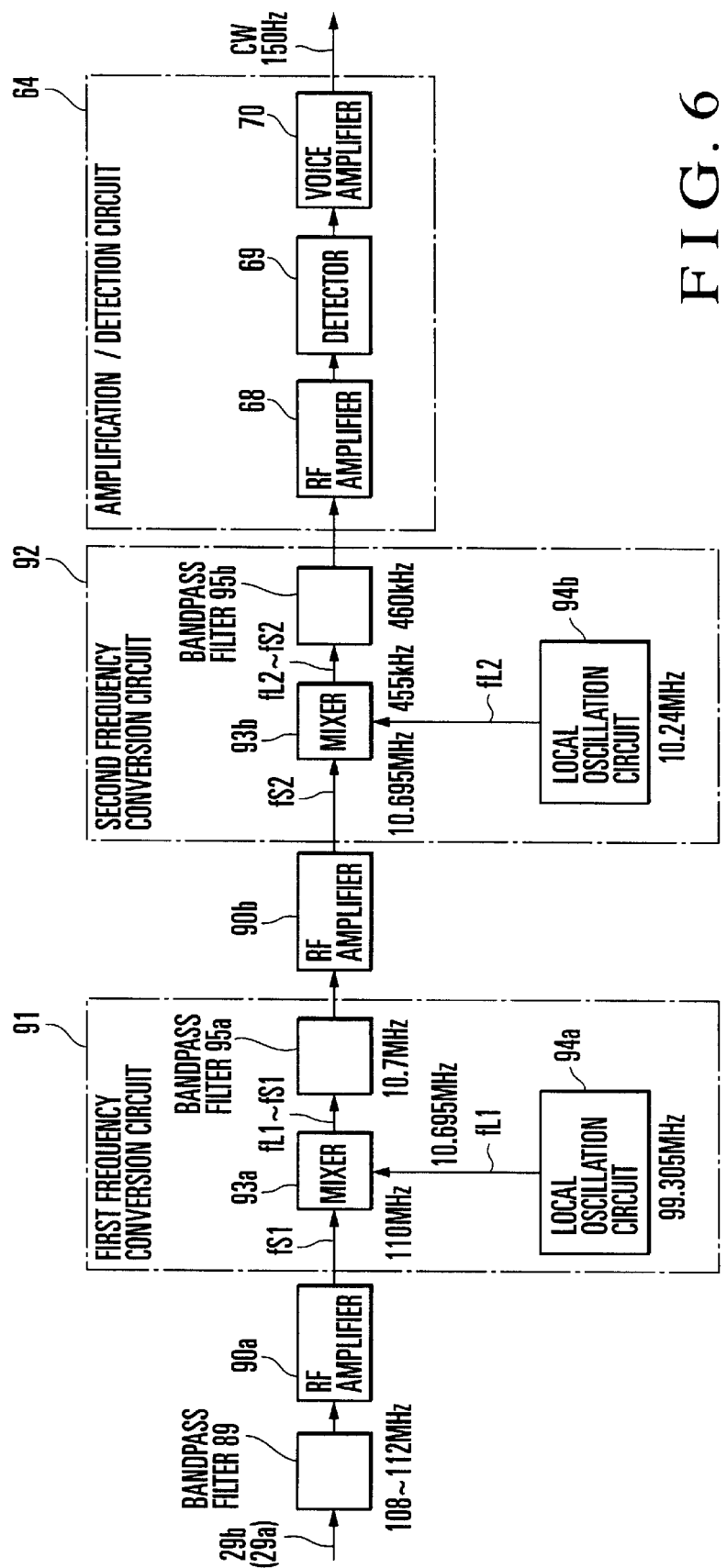
FIG. 6 is a detailed block diagram of a far field monitor receiver shown in FIG. 1.

FIG. 6 shows the receiver 33b. The receiver 33a has the same arrangement as in FIG. 6.

The receiver 33b comprises a bandpass filter 89 for receiving the combined signal 29b, an RF amplifier 90a for receiving the output from the bandpass filter 89, a first frequency conversion circuit 91 for receiving the output from the RF amplifier 90a, an RF amplifier 90b for receiving the output from the first frequency conversion circuit 91, a second frequency conversion circuit 92 for receiving the output from the RF amplifier 90b, and the amplification/detection circuit 64 for receiving the output from the second frequency conversion circuit 92.

The first frequency conversion circuit 91 has a mixer 93a, local oscillation circuit 94a, and bandpass filter 95a. The second frequency conversion circuit 92 has a mixer 93b, local oscillation circuit 94b, and bandpass filter 95b. The amplification/detection circuit 64 has the RF amplifier 68, detector 69, and voice amplifier 70. The first frequency conversion circuit 91, second frequency conversion circuit 92, and amplification/detection circuit 64 construct a detection circuit using the double super heterodyne scheme.

For the RF combined signal 29b, 108- to 112-MHz frequency components are selected by the 108–112-MHz bandpass filter 89. After that, the signal is amplified to a predetermined level by the RF amplifier 90a and input to the first frequency conversion circuit 91 as an RF signal having a frequency fS1.

The mixer 93a of the first frequency conversion circuit 91 receives the RF signal having the frequency fS1 and a local oscillation voltage having a frequency fL1 and generates a mixer output containing a number of frequency components including the harmonic, sum, and difference of the frequencies fS1 and fL1. The bandpass filter 95a extracts the difference between the frequencies fS1 and fL1 (fL1–fS1) from the mixer output, thereby obtaining a signal having an intermediate frequency.

For example, when fS1 =110 MHz, fL1–fS1=10.695 MHz can be obtained by setting fL1=99.305 MHz. The output from the first frequency conversion circuit 91 is amplified to a predetermined level by the RF amplifier 90b and output to the second frequency conversion circuit 92 as an RF signal having a frequency fS2.

The mixer 93b of the second frequency conversion circuit 92 receives the RF signal having the frequency fS2 and a local oscillation voltage having a frequency fL2 and generates a mixer output containing a number of frequency components. The bandpass filter 95b extracts the difference between the frequencies fS2 and fL2 (fL2–fS2) from the mixer output, thereby obtaining a signal having a lower intermediate frequency.

For example, when fS2=10.695 MHz, fL2–fS2 =455 kHz can be obtained by setting fL2=10.24 MHz. The output from the second frequency conversion circuit 92 is input to the amplification/detection circuit 64, so the voice output (CW) is obtained. Thus, the selectivity of 60 dB or more in the ±50-kHz band and a receiving sensitivity as high as 10 dB or more in terms of (S+N)/N ratio at an input level of 5 $\mu$V, which are necessary for the far field monitor, can be realized.

Figure 7:
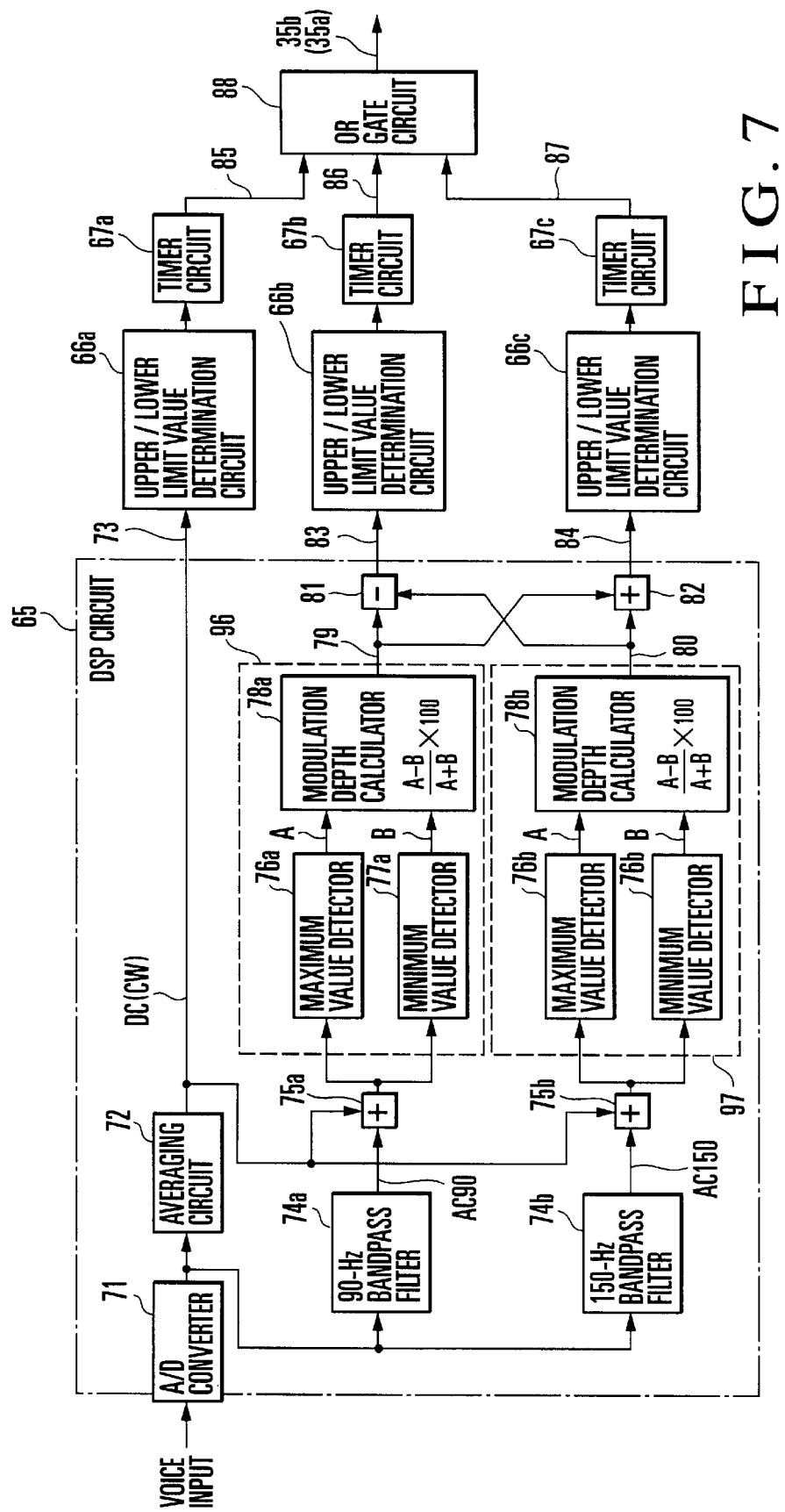
FIG. 7 is a detailed block diagram of a far field monitor detector shown in FIG. 1.
Figure 8:
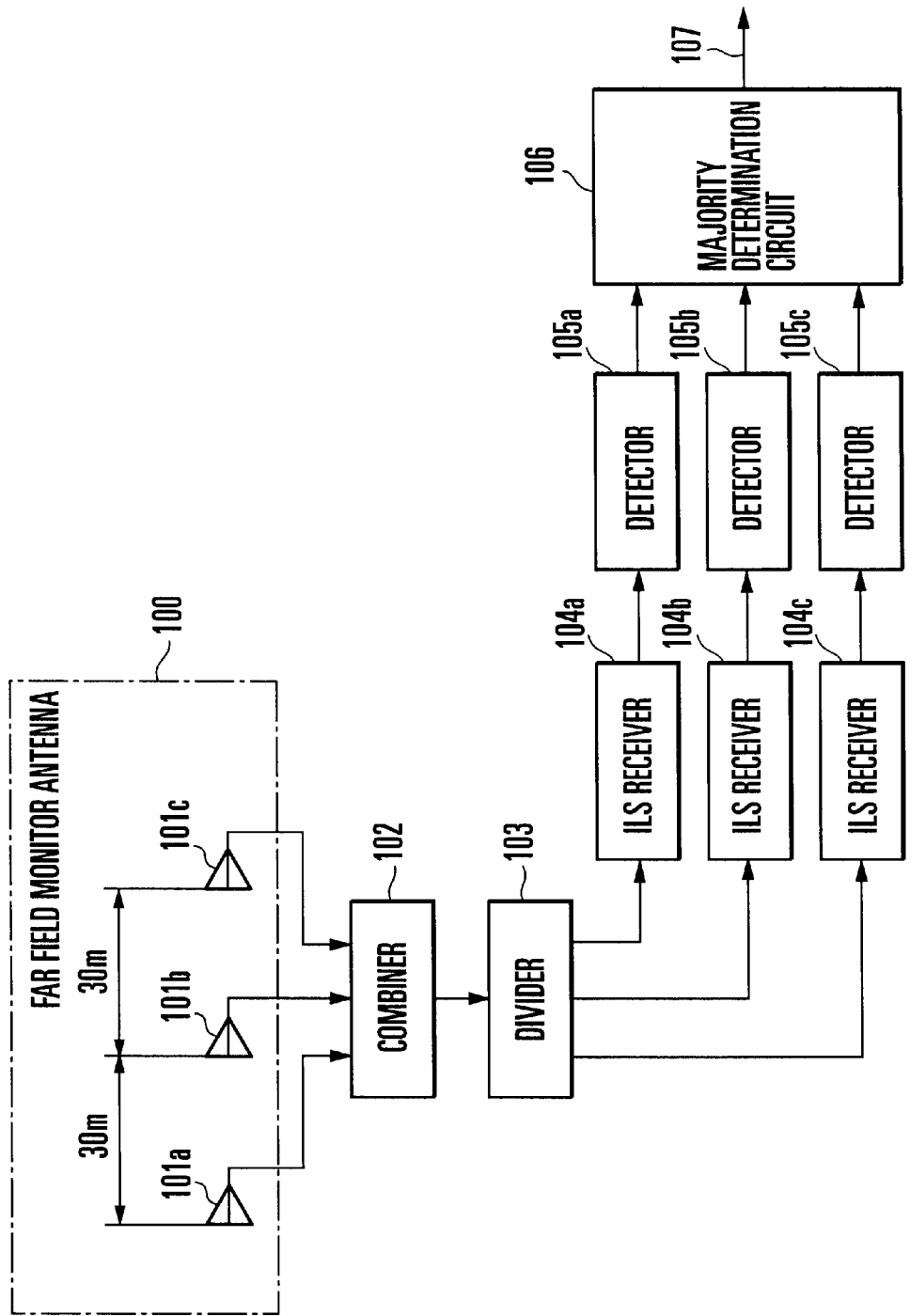
FIG. 8 is a block diagram of a conventional far field monitor apparatus.
Figure 9A:
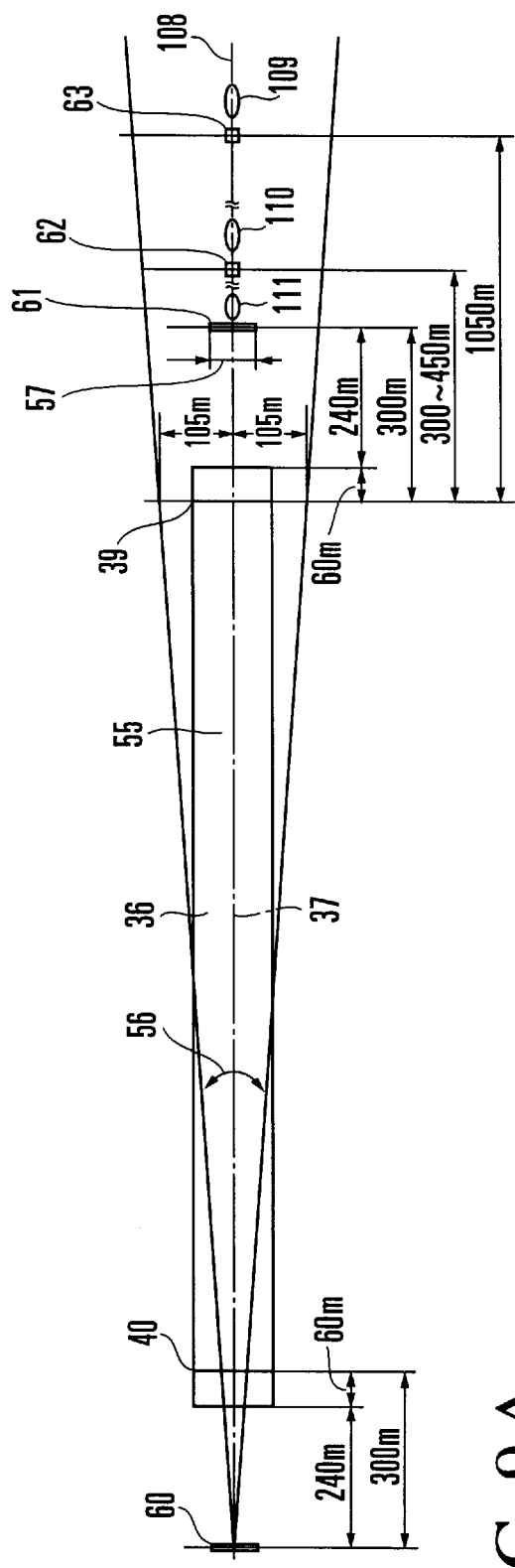
FIGS. 9A and 9B are plan and side views, respectively, showing an installation example of the conventional far field monitor apparatus.
Figure 9B:
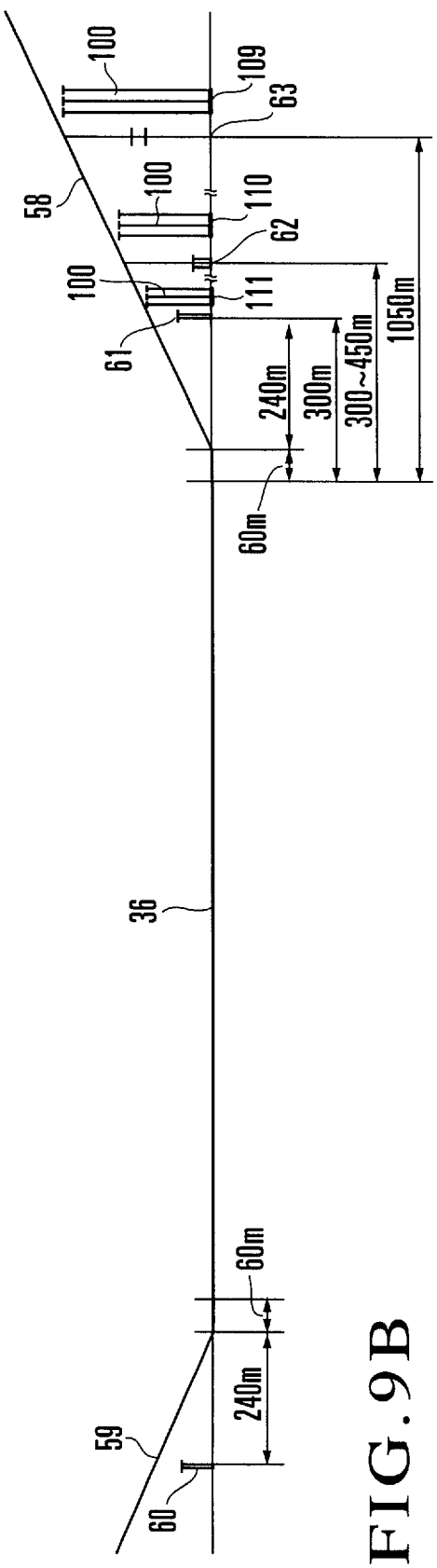

FIG. 7 shows the far field monitor detector 34b. A far field monitor detector 34a has the same arrangement as in FIG. 7.

Referring to FIG. 7, the detector 34b w comprises the DSP circuit 65, upper/lower limit value determination circuits 66a to 66c, timer circuits 67a to 67c, and OR gate circuit 88.

The DSP circuit 65 comprises the A/D converter 71, averaging circuit 72, 90-Hz bandpass filter 74a, 150-Hz bandpass filter 74b, adders 75a and 75b, maximum value detectors 76a and 76b, minimum value detectors 77a and 77b, modulation depth calculators 78a and 78b, subtractor 81, and adder 82.

The detector 34b has the same circuit arrangement as that of the integral monitor detector 31b shown in FIG. 4 except that the amplification/detection circuit 64 is replaced with the receiver 33b having higher receiving sensitivity, and a detailed description of the circuit arrangement and operation in the DSP circuit 65 will be omitted.

In the DSP circuit 65, first, the voice input (AM-modulated wave) from the receiver 33b is A/D-converted by the A/D converter 71 and then separated into 90- and 150-Hz modulated wave components. Next, the 90- and 150-Hz modulation depths are obtained from the amplitude ratio of the components. As monitor parameters, the DDM signal 83 is detected from the difference between the 90- and 150-Hz modulation depths, and the SDM signal 84 is detected from the sum of the 90- and 150-Hz modulation depths. In addition, the RF level 73 is detected from the amplitude of the carrier wave (CW).

The upper/lower limit value determination circuits 66a to 66c compare the values of the monitor parameters (RF, DDM, and SDM) with predetermined values and output alarm signals when the values exceed the predetermined values. The timer circuits 67a to 67c measure the alarm duration for the monitor parameters: RF, DDM, and SDM.

When the alarm duration exceeds a predetermined time set within the range of 30 to 240 sec, the timer circuits 67a to 67c output the RF alarm signal 85, DDM alarm signal 86, and SDM alarm signal 87 to the OR gate circuit 88, respectively. When even one of the alarm signals is input, the OR gate circuit 88 outputs a control signal 35b or 35a for transferring or shutting down the transmitter 5a or 5b.

To reverse the aircraft approach direction because of a change in meteorological conditions in the airport, the runway selection signal 2 having an opposite logic is supplied to the interlock controller 3. The interlock control signal 4a changes from ON to OFF, and the interlock control signal negation signal 4b changes from OFF to ON. As a consequence, the ILS localizer on the operation side is switched to the opposite side, and the opposing-side ILS localizer is switched to the operation side. Simultaneously, the far field monitor function is also reversed.

In the above-described embodiment, the array antenna 21b has the plurality of antenna elements 13b to 16b. However, the number of antenna elements is not limited to the above-described number, i.e., 14 to 24. More specifically, the number of antenna elements can be so small as to average the receiving levels as the far field monitor and prevent detection errors due to cancel of the direct wave and reflected wave. Hence, the optimum number of antenna elements, which poses no problem in practical use, is totally determined by evaluating the operation conditions in units of airports.

In the above description, for the left array antenna 22b and right array antenna 23b, even numbers of antenna elements are arranged symmetrically in a direction perpendicular to the extended runway center line 108. However, the number of elements of each array antenna is not limited to an even number. For example, one antenna element may be added onto the extended runway center line 108 to construct an antenna array having an odd number of antenna elements including the even number of antenna elements arranged symmetrically in the direction perpendicular to the extended runway center line 108 such that receiving signals are vector-combined by the combiner 28b. In this case as well, since only the carrier pattern 41 is present on the localizer course 55, the far field monitor can be implemented as in use of the even number of antenna elements.

A case wherein the array antenna 21b of the opposing-side ILS localizer 61 is used as a receiving antenna has been described above. However, a receiving antenna may be separately installed. More specifically, as far as the plurality of antenna elements 13b to 16b are symmetrically arranged in the direction perpendicular to the extended runway center line 108 at appropriate positions between the rear side of the opposing-side ILS localizer 61 and a portion close to the middle marker 63, a far field monitor can be implemented.

Referring to FIG. 1, the antenna elements 13a to 16a, pickup elements 17a to 20a, combiner 28a, switch 30a, receiver 33a, and detector 34a constructing the far field monitor apparatus on the operation-side ILS localizer 60 side have the same functions as those of the antenna elements 13b to 16b, pickup elements 17b to 20b, combiner 28b, switch 30b, and receiver 33b, and detector 34b constructing the far field monitor apparatus on the opposing-side ILS localizer 61 side.

Hence, in the above-described embodiment, the operation-side ILS localizer 60 is set in the operative state to radiate radio waves, and the opposing-side ILS localizer 61 is set in the inoperative state to stop radiating radio waves. However, the present invention is not limited to this. More specifically, even when the operation states of the two ILS localizers replace with each other, the same functions and effects as described above can be obtained by replacing the operation side with the opposing side.

As has been described above, as the first effect of the present invention, secondary reflected waves from approaching or departing aircraft or aircraft moving on the runway hardly affects the apparatus. The first reason for this is that the receiving signals can be averaged using the array antenna having a plurality of antenna elements as a receiving antenna. The second reason is that since the antenna elements are symmetrically arranged in the direction perpendicular to the extended runway center line, secondary reflected waves from aircraft that is passing on the localizer course become almost symmetric with respect to the course and can be canceled.

As the second effect, an apparent DDM detection error can be prevented. This is because since the receiving signals from the plurality of antenna elements arranged in the direction perpendicular to the extended runway center line are combined, a phenomenon in which the RF phases of the direct wave and reflected wave are inverted to apparently eliminate the signal, or the RF signal is shielded by an obstacle or the like can be prevented.

As the third effect, a large clearance to obstacles can be ensured for approaching aircraft. The first reason for this is that since the array antenna of the opposing-side ILS localizer is used as the far field monitor of the operation-side ILS localizer, a sufficient array gain can be obtained. The second reason is that the height of the receiving antenna can be minimized because it is on the line of sight.

As the fourth effect, an inexpensive and simple far field monitor can be constructed. This is because the integral monitor system of the opposing-side ILS localizer is partially used, and therefore, the area for the far field monitor apparatus need not be ensured, and large-scale construction is unnecessary.

What is claimed is:

1. A far field monitor apparatus having first and second ILS (Instrument Landing System) localizers opposing via a runway in a longitudinal direction, each of the first and second ILS localizers comprising:
receiving antenna means formed from a plurality of antenna elements symmetrically arranged in a direction perpendicular to the longitudinal direction of the runway, said receiving antenna means of the first and second ILS localizers opposing each other;
a plurality of coupling means, arranged in units of antenna elements, for picking up some of signals obtained by the antenna elements in a predetermined amplitude and phase;
combine means for combining output signals from said coupling means;
receiving means for receiving a combined signal output from said combine means; and
first detection means for detecting, on the basis of a receiving signal output from said receiving means, a predetermined monitor parameter representing a radiation state of a radio wave radiated from the opposing-side ILS localizer.

2. An apparatus according to claim 1, wherein said receiving antenna means comprises an array antenna.

3. An apparatus according to claim 1, further comprising second detection means for detecting, from the combined signal output from said combine means, a predetermined monitor parameter representing a radiation state of a radio wave radiated from said receiving antenna means, and
switching means for selectively outputting the combined signal from said combine means to one of said receiving means and said second detection means.

4. An apparatus according to claim 3, wherein
when the radio wave is radiated from the first ILS localizer, said switching means selectively outputs the combined signal from said combine means to said detection means of the first ILS localizer, and
when the radio wave is radiated from the second ILS localizer, said switching means selectively outputs the combined signal from said combine means to said receiving means.

5. An apparatus according to claim 4, wherein said switching means performs a switching operation on the basis of an interlock control signal for instructing the first receiving antenna means to radiate the radio wave.

6. An apparatus according to claim 1, wherein said receiving means comprises
frequency conversion means, using a super heterodyne scheme, for converting the combined signal from said combine means into a signal having a different frequency using a predetermined local oscillation frequency, and amplification/detection means for amplifying/detecting an output signal from said frequency conversion means and outputting the receiving signal.

7. An apparatus according to claim 6, wherein said frequency conversion means comprises a plurality of cascade-connected super heterodyne detection circuits for demodulating an input signal using different local oscillation frequencies.

8. An apparatus according to claim 1, wherein said first detection means comprises calculation means for calculating an A/D conversion output from said receiving means to detect the predetermined monitor parameter.

9. An apparatus according to claim 8, wherein said calculation means comprises a DSP processor for performing DSP (Digital Signal Processing).

10. An apparatus according to claim 8, wherein said first detection means comprises determination means for comparing the monitor parameter output from said calculation means with an upper limit value and lower limit value and, when the monitor parameter falls outside an allowable range defined by the upper limit value and lower limit value, outputting an alarm signal.

11. An apparatus according to claim 10, wherein said determination means outputs the alarm signal when the monitor parameter falls outside the allowable range for not less than a predetermined period.

12. An apparatus according to claim 8, wherein said calculation means comprises
   an A/D conversion section for converting an analog input signal into digital data,
   an averaging section for averaging the digital data output from said A/D conversion section and outputting an RF level representing a DC component of the input signal,
   a 90-Hz bandpass filter for outputting a 90-Hz AC component in a 90-Hz band from the digital data output from said A/D conversion section,
   a 150-Hz bandpass filter for outputting a 150-Hz AC component in a 150-Hz band from the digital data output from said A/D conversion section,
   a first adder for adding the RF level from said averaging section and the 90-Hz AC component from said 90-Hz bandpass filter,
   a second adder for adding the RF level from said averaging section and the 150-Hz AC component from said 150-Hz bandpass filter,
   a first modulation depth calculation section for calculating a depth of modulation on the basis of a maximum and minimum values output from said first adder,
   a second modulation depth calculation section for calculating a depth of modulation on the basis of a maximum and minimum values output from said second adder,
   a subtractor for subtracting outputs from said first and second modulation depth calculation sections to output a DDM (Difference of Depth of Modulation) signal, and
   an adder for adding the outputs from said first and second modulation depth calculation sections to output an SDM (Sum of Depth of Modulation) signal.

13. An apparatus according to claim 12, wherein said averaging section accumulates and adds the digital data from said A/D conversion section a predetermined number of times and divides a sum result by the predetermined number to calculate the RF level.

14. An apparatus according to claim 12, wherein
   said first modulation depth calculation section calculates the depth of modulation on the basis of an RF level representing a DC component of an output from said first adder and a maximum amplitude value for the RF level, and
   said second modulation depth calculation section calculates the depth of modulation on the basis of an RF level representing a DC component of an output from said second adder and a maximum amplitude value for the RF level.

15. An apparatus according to claim 14, wherein
   said first modulation depth calculation section uses, for calculation of the depth of modulation, an average value of a predetermined number of maximum amplitude values for the RF level representing the DC component of the output from said first adder, and
   said second modulation depth calculation section uses, for calculation of the depth of modulation, an average value of a predetermined number of maximum amplitude values for the RF level representing the DC component of the output from said second adder.

16. An apparatus according to claim 3, wherein said second detection means comprises
   amplification/detection means for amplifying/detecting the receiving signal from said receiving means, and
   calculation means for calculating an A/D conversion output from said amplification/detection means to detect the predetermined monitor parameter.

17. An apparatus according to claim 16, wherein said calculation means comprises a DSP processor for performing DSP (Digital Signal Processing).

18. An apparatus according to claim 16, wherein said first detection means comprises determination means for comparing the monitor parameter output from said calculation means with an upper limit value and lower limit value and, when the monitor parameter falls outside an allowable range defined by the upper limit value and lower limit value, outputting an alarm signal.

19. An apparatus according to claim 18, wherein said determination means outputs the alarm signal when the monitor parameter falls outside the allowable range for not less than a predetermined period.

20. An apparatus according to claim 16, wherein said calculation means comprises an A/D conversion section for converting an analog input signal into digital data,
   an averaging section for averaging the digital data output from said A/D conversion section and outputting an RF level representing a DC component of the input signal,
   a 90-Hz bandpass filter for outputting a 90-Hz AC component in a 90-Hz band from the digital data output from said A/D conversion section, a 150-Hz bandpass filter for outputting a 150-Hz AC component in a 150-Hz band from the digital data output from said A/D conversion section,
   a first adder for adding the RF level from said averaging section and the 90-Hz AC component from said 90-Hz bandpass filter,
   a second adder for adding the RF level from said averaging section and the 150-Hz AC component from said 150-Hz bandpass filter,
   a first modulation depth calculation section for calculating a depth of modulation on the basis of a maximum and minimum values output from said first adder,
   a second modulation depth calculation section for calculating a depth of modulation on the basis of a maximum and minimum values output from said second adder,
   a subtractor for subtracting outputs from said first and second modulation depth calculation sections to output a DDM (Difference of Depth of Modulation) signal, and an adder for adding the outputs from said first and second modulation depth calculation sections to output an SDM (Sum of Depth of Modulation) signal.

21. An apparatus according to claim 20, wherein said averaging section accumulates and adds the digital data from said A/D conversion section a predetermined number of times and divides a sum result by the predetermined number to calculate the RF level.

22. An apparatus according to claim 20, wherein said first modulation depth calculation section calculates the depth of modulation on the basis of an RF level representing a DC component of an output from said first adder and a maximum amplitude value for the RF level, and said second modulation depth calculation section calculates the depth of modulation on the basis of an RF level representing a DC component of an output from said second adder and a maximum amplitude value for the RF level.

23. An apparatus according to claim 22, wherein said first modulation depth calculation section uses, for calculation of the depth of modulation, an average value of a predetermined number of maximum amplitude values for the RF level representing the DC component of the output from said first adder, and said second modulation depth calculation section uses, for calculation of the depth of modulation, an average value of a predetermined number of maximum amplitude values for the RF level representing the DC component of the output from said second adder.

* * * * *